Jan. 15, 1924.

T. OLINGER 1,480,948

ATTACHING MEANS FOR PULLEYS OR THE LIKE

Filed Sept. 28, 1922

Inventor
Thomas Olinger
By Frank E. Liverance, Jr.
Attorney

Patented Jan. 15, 1924.

1,480,948

UNITED STATES PATENT OFFICE.

THOMAS OLINGER, OF HOLLAND, MICHIGAN, ASSIGNOR, BY MESNE ASSIGNMENTS, TO FEDERAL MANUFACTURING COMPANY, OF HOLLAND, MICHIGAN, A CORPORATION OF MICHIGAN.

ATTACHING MEANS FOR PULLEYS OR THE LIKE.

Application filed September 28, 1922. Serial No. 591,197.

*To all whom it may concern:*

Be it known that I, THOMAS OLINGER, a citizen of the United States of America, residing at Holland, in the county of Ottawa and State of Michigan, have invented certain new and useful Improvements in Attaching Means for Pulleys or the like; and I do hereby declare the following to be a full, clear, and exact description of the invention, such as will enable others skilled in the art to which it appertains to make and use the same.

This invention relates to a pulley construction, specifically, wherein a screw may be permanently connected with a pulley housing in which a pulley is rotatably mounted. More broadly, the invention is not limited in use to pulleys, but is concerned with a novel means of connection of a shank, terminating in a threaded portion for insertion into a support, with any sheet metal housing structure irrespective of what is mounted in the housing. The invention is particularly useful in connection with small pulleys, such as are used to carry the damper and draft chains used in furnaces. Or the pulleys may be used to carry awning ropes or the like. It is an object and purpose of the present invention to make a construction of the character outlined, in which the threaded shank is securely and permanently connected, is simple and economical in structure, durable and effective in use and readily produced in large quantities at low cost. These and other objects and purposes will appear as understanding of the invention is had from the following description, taken in connection with the accompanying drawing, in which, Fig. 1 is a perspective view of a pulley equipped with my invention.

Like reference characters refer to like parts in the different figures of the drawing.

Figure 1:
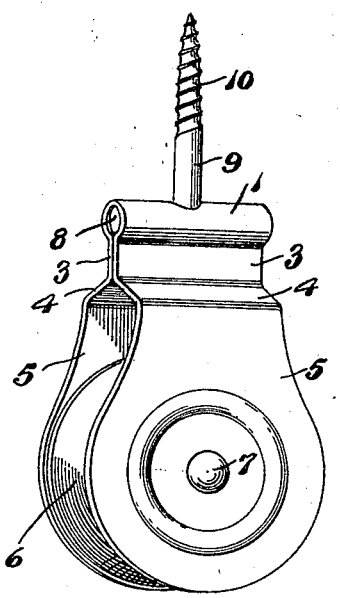
Figure 2:
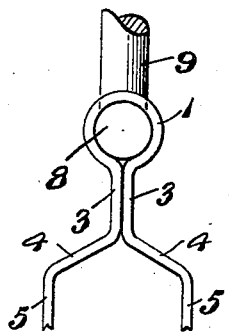
Fig. 2 is a fragmentary side elevation thereof.
Figure 3:
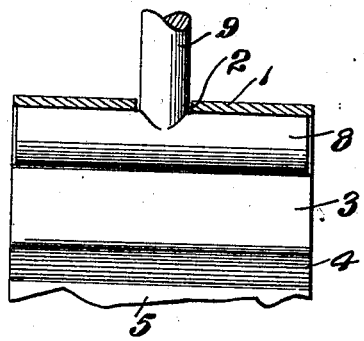
Fig. 3 is an enlarged fragmentary vertical section through the upper part of the pulley and in a plane paralleling the front and rear sides of the pulley.

In the construction shown, embodying the invention, a sheet metal pulley housing is shown made from a single piece of sheet metal and bent at its middle into a cylindrical loop 1 extending the full width of the housing, from the lower sides of which sides 3 extend downwardly for a short distance in contact with each other at their inner surfaces, it being designed that said parts 3 shall be permanently and inseparably connected together by any suitable means such as spot welding, or its equivalent. In the upper side of the loop 1, an opening 2 is made midway between the ends of the loop for the passage of the shank, as will hereafter appear.

Each of the parts 3 is turned outwardly and downwardly for a short distance making the parts 4 from the outer edges of which sides 5 are bent to extend downwardly in parallel spaced apart relation. Between the sides 5, a pulley 6 is located and is rotatably mounted on a pin 7 extending through and between said sides 5 and furnishing a bearing for the pulley. Any other suitable method of rotatably mounting the pulley between the sides of the housing may be used quite as well as that specifically outlined.

The loop 1 is shaped to receive the head 8, in the shape of a cylindrical rod, of a T-headed screw, the shank 9 connected with head 8 passing through the opening 2 in the loop 1 and at its outer end being formed with threaded construction as indicated at 10 or other suitable means for connection to a support.

It will be evident that in the assembly of the screw member with the housing, the loop 1 is not completely formed when this takes place, the sides of the housing being separated far enough to permit the head to pass between them and to position against the inner side of the upper curved portion of the loop, after which, in a punch press, by means of suitable dies, the loop is completed and the parts 3 formed and brought together, ready for securing together. Of course, it is not absolutely essential that the parts 3 be spot welded or otherwise permanently connected, as the pulley is serviceable without, but it is preferred for some reasons.

The outer threaded portion 10 of the shank 9 is adapted to be inserted into a suitable support, such as an over head joist in a basement where a furnace is installed, or a window casing where the pulley is to be used for carrying awning ropes, or the like, or any other support wherever the pulley is to be used. The construction described is very simple, practical and economical to manufacture. It is easily produced in large quantity production. The appended claims define the invention, and said claims only limit the invention and not any specific disclosure of structure hereto made.

I claim:

1. In a construction of the class described, a housing formed from a single piece of sheet metal bent midway between its ends into a cylindrical loop having an opening in its upper side, the loop at its lower sides being continued in two downwardly extending parts located side by side, and a T-head screw element having a shank threaded at its outer end and passing through the said opening in the loop, and a head housed within the loop, substantially as described.

2. In a construction of the class described, a housing formed from a single piece of sheet metal, bent between its ends into a cylindrical loop having an opening in its upper side, the metal from which the loop is formed being continued at the lower side of the loop in two downwardly extending parts located side by side, thence each being bent outwardly for a distance and then downwardly to make two spaced apart parallel sides, a pulley rotatably mounted between said sides, and a T-head element having a head located within the loop and a shank passing through said opening in the loop.

3. In a construction of the class described, a housing formed from a single piece of sheet metal bent between its ends into a cylindrical loop having an opening in its upper side, the metal being continued from the opposite side of the loop as two parts lying in contact with each other, means for permanently connecting said contacting parts together, and a screw having a head housed within the loop and a shank extending outwardly through the opening in said loop, substantially as described.

In testimony whereof I affix my signature.

THOMAS OLINGER.